June 19, 1934.  S. MAZUR  1,963,094
SELF STARTING SYNCHRONOUS ELECTRIC MOTOR
Filed Dec. 8, 1931
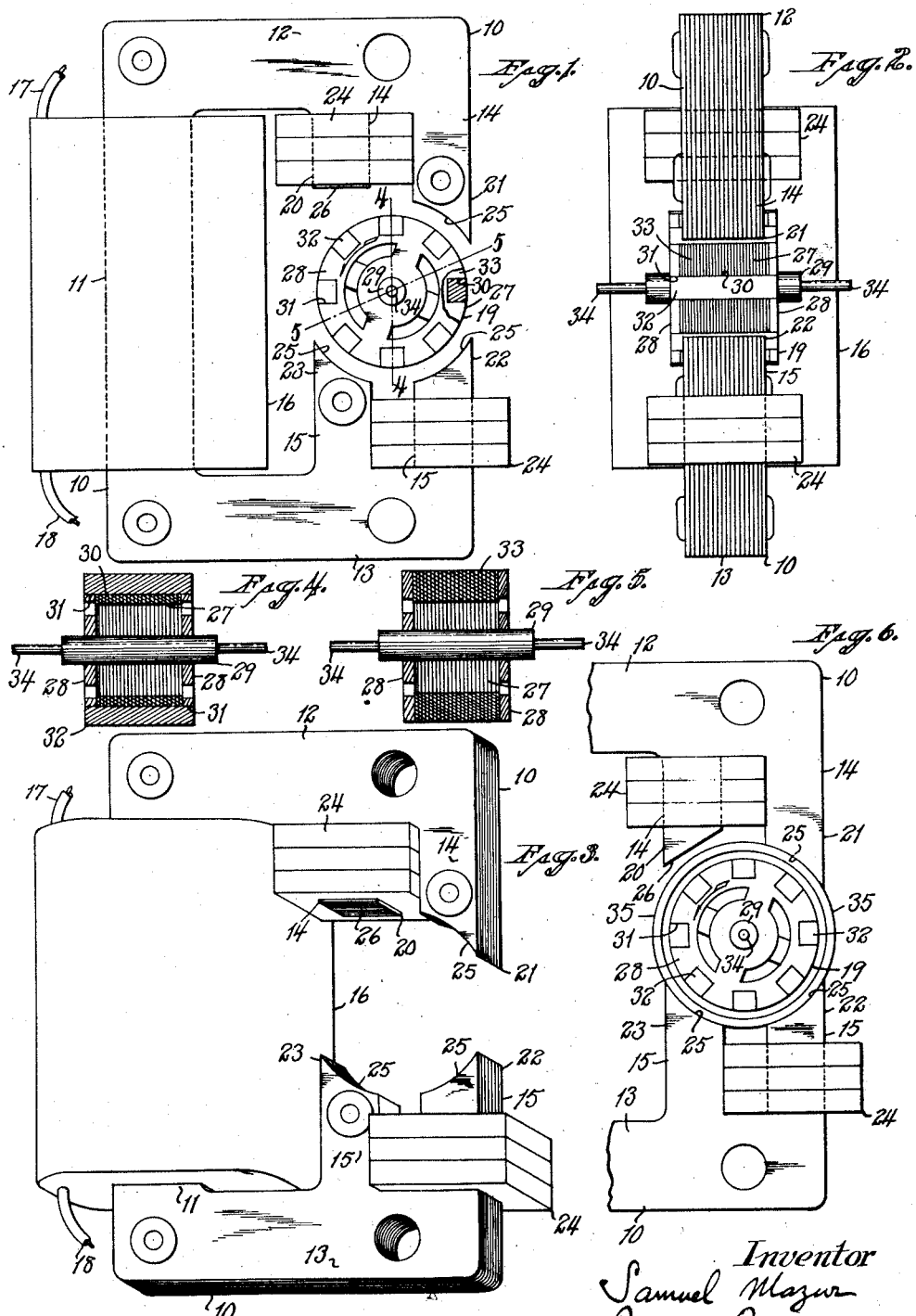
Inventor
Samuel Mazur
By Popp + Powers
Attorneys Patented June 19, 1934

1,963,094

UNITED STATES PATENT OFFICE 1,963,094

SELF-STARTING SYNCHRONOUS ELECTRIC MOTOR

Samuel Mazur, Bristol, Conn., assignor to The Sessions Clock Company, Forestville, Conn., a corporation of Connecticut Application December 8, 1931, Serial No. 579,744

4 Claims. (Cl. 172—278)

This invention relates to an improvement in self-starting synchronous electric motors primarily designed for driving clock-mechanisms and other time-devices and relates in particular to self-starting synchronous electric motors having stator- or field-structures capable of developing asymmetric rotating magnetic fields to insure inherent self-starting characteristics.

One of the major difficulties to be overcome in the design and manufacture of self-starting synchronous electric motors lies in securing a proper balance between the self-starting torque on one hand and the synchronous torque on the other hand. It is obvious that if at synchronous speeds the self-starting torque materially exceeds the tendency of the rotor to synchronously interlock with the intermittent magnetic field, then the rotor will, in all likelihood, "run away," so to speak, and operate erratically at super-synchronous speeds. On the other hand, should the magnetic interlock between the rotor and the field be markedly stronger than the self-starting torque, then the motor will not be self-starting except possibly under unusual conditions.

Self-starting synchronous electric motors, therefore, have been difficult to manufacture on a mass production basis inasmuch as while one motor of a lot may operate properly, another motor from the same lot and apparently corresponding to the satisfactory motor and made from the same tools, is apt to misbehave in one way or another, such, for instance, as by failure to start, or, if it does start, by failure to run synchronously.

The main object of my invention, therefore, is to provide at a low cost for manufacture, a self-starting synchronous electric-motor structure which may be relied upon, when manufactured by mass production methods, to be both self-starting and synchronous.

With the above and other objects in view, as will appear from the following, my invention consists in a self-starting synchronous electric motor characterized by the provision of means to make the magnetic field of the stator of the motor both rotating and asymmetric at the same time and for this purpose having certain features of construction and combinations and arrangements of parts as will be hereinafter described and particularly recited in the claims.

In the accompanying drawing:

Fig. 1 is a face view of one form which a self-starting synchronous electric motor, constructed in accordance with my invention, may assume, the bearings for the rotor being omitted for clarity of illustration.

Fig. 2 is an edge view thereof;

Fig. 3 is a perspective view of the field-structure, detached;

Fig. 4 is a transverse sectional view through the rotor, taken on the line 4—4 of Fig. 1;

Fig. 5 is a similar view taken on the line 5—5 of Fig. 1; and

Fig. 6 is a broken face view of another form which a synchronous motor constructed in accordance with my invention may assume.

The particular self-starting synchronous electric motor herein chosen for the illustration of my invention in Figs. 1 to 5 inclusive, consists as shown of a laminated field- or stator-structure, generally designated by the numeral 10, and formed, in accordance with usual practice, of superimposed layers of sheet silicon-steel, iron, or other suitable magnetic material.

For the purpose of convenience of description, the stator-structure 10 may be said to consist of a cross-reach 11 and a pair of complementary arms 12 and 13 projecting therefrom and turned inwardly toward each other at their respective ends to form pole-pieces 14 and 15 respectively. Mounted upon the cross-reach 11 of the laminated stator-structure 10 is the usual field-coil 16 having leads 17 and 18 adapted to be connected in any suitable manner to a source of alternating current.

The pole-pieces 14 and 15, just above referred to, extend into relatively-close proximity to a rotor 19 on the respective opposite sides thereof, and are bifurcated or split to respectively form pole-sections 20—21 and 22—23. The pole-sections 20 and 22 have applied to them a suitable number of so-called "shading-coils" 24, usually consisting of copper, or other highly-conductive plates or rings which serve to "split the phase," so to speak, inasmuch as magnetic impulses will not pass through the shaded pole-sections 20 and 22 aforesaid as rapidly as they will pass through the unshaded pole-sections 21 and 23.

The shading of one of the pole-sections of each of the respective pole-pieces 14 and 15 serves to create a rotating magnetic field which is sufficient to cause the rotor to start immediately upon the energization of the field-coil 16.

The terminal face 25 of each of the respective pole-sections 21, 22 and 23 is preferably curved as shown, to conform to the curvature of the rotor 19, while the terminal face 26 of the pole-section 20 is located further away from the periphery of the rotor than the terminal faces 25 of the remaining pole-sections, so that the path of travel for the magnetic flux between the shaded pole-sections 20 and 22 is of markedly greater reluctance than the path between the unshaded pole-sections 21 and 23, for the purpose of imposing constant and stationary asymmetry upon the rotating magnetic field created by the shaded and unshaded poles.

The rotor 19 may be of any approved type capable of being synchronously propelled by the asymmetric rotating magnetic field provided by the field-structure, but as herein shown, it is preferably of a laminated character and composed of a plurality of rings 27 of magnetic material arranged axially side by side to form, when so assembled, a rotor-body of tubular or cylindrical form.

Arranged axially in line with and flanking the respective opposite sides of the stack of rings 27, are complementary end-plates 28—28, preferably formed of copper or other material of high electrical conductivity. The said end-plates 28—28 are punched out into skeletonized form for the purpose of providing ventilation through the interior of the rotor-structure, and are staked or otherwise secured to a rotor-shaft 29.

The periphery of each of the rings 27 is provided with an annular series of equidistant transverse notches 30, and, similarly, each of the end-plates 28—28 is formed with a corresponding annular series of notches 31. The notches 30 of the respective rings 27 are aligned with each other and with the notches 31 in the end-plates 28—28, as shown, to form an annular series of transverse grooves into each of which is installed a short-circuiting- or spacing-bar 32, extending transversely of the rotor and serving not only to electrically interconnect the said end-plates 28—28, but also to divide the rings 27 into a plurality of marked geometrical poles 33.

The rotor-shaft 29 is provided at its opposite ends respectively with trunnions 34—34, which are adapted to revolve in any suitable bearings, which latter, for the purpose of clarity of illustration, have been omitted from the drawing.

If desired, I may combine with the shading and differential reluctance features, already described, of the motor, a distributing-ring 35 (Fig. 6), which encircles the rotor in spaced relationship with respect thereto and is supported by frictional engagement with the curved terminal faces 25 of the pole-sections 21, 22 and 23. The distributing-ring 35, just referred to, is preferably formed of copper and acts, probably owing to the generation of eddy currents therein, to enhance the effect of the asymmetric rotating magnetic field already referred to in securing a proper and elastic balance between self-starting torque and synchronous torque.

As before pointed out, one of the main difficulties to be overcome in the design and manufacture of self-starting synchronous electric motors lies in securing a proper balance between the self-starting torque on one hand and the synchronous torque on the other hand. By providing in the manner disclosed means to create a magnetic stator field which is both asymmetric and rotating I have found that it is practicable to manufacture self-starting synchronous electric motors by mass production methods with a negligible amount of rejections on account of failure to either self-start or to run synchronously.

It will be understood by those skilled in the art that my invention may assume varied physical forms without departing from my inventive concept and I, therefore, do not limit myself to the specific embodiment herein chosen for illustration, but only as indicated in the appended claims.

I claim:

1. In a self-starting synchronous electric motor, the combination with a rotor; of a stator-structure having a plurality of shaded polar-projections and a plurality of unshaded polar-projections cooperating therewith for creating a split-phase effect and located adjacent the said rotor and so positioned with respect thereto as to provide a path for magnetic flux between the said unshaded polar-projections of markedly less reluctance than the path provided between the said shaded polar-projections, whereby an asymmetric character is imposed upon the magnetic field of the stator.

2. In a self-starting synchronous electric motor, the combination with a rotor having polar-projections of magnetic material and provided with non-magnetic short-circuiting means around said polar-projections; of a stator-structure having a plurality of shaded polar-projections and a plurality of unshaded polar-projections cooperating therewith for creating a split-phase effect and located adjacent the said rotor and so positioned with respect thereto as to provide a path for magnetic flux between the said unshaded polar-projections of markedly less reluctance than the path provided between the said shaded polar-projections, whereby an asymmetric character is imposed upon the magnetic field of the stator.

3. In a self-starting synchronous electric motor, the combination with a rotor; of a stator-structure having a plurality of shaded polar-projections and a plurality of unshaded polar-projections cooperating therewith for creating a split-phase effect and located adjacent the said rotor and constructed and related so as to provide a path for magnetic flux between said unshaded polar-projections of markedly less reluctance than the path between said shaded polar-projections, whereby an asymmetric character is imposed upon the magnetic field of the stator.

4. In a self-starting synchronous electric motor, the combination with a rotor having a plurality of polar-projections of magnetic material and provided with non-magnetic short-circuiting means encircling said polar-projections; of a stator-structure having a plurality of shaded polar-projections and a plurality of unshaded polar-projections cooperating therewith for creating a split-phase effect and located adjacent the said rotor and constructed and related so as to provide a path for magnetic flux between said unshaded polar-projections of markedly less reluctance than the path between said shaded polar-projections, whereby an asymmetric character is imposed upon the magnetic field of the stator.

SAMUEL MAZUR.